(12) United States Patent
Balensiefer, II et al.

(10) Patent No.: US 7,090,294 B2
(45) Date of Patent: Aug. 15, 2006

(54) JUVENILE VEHICLE BOOSTER SEAT KIT

(75) Inventors: Eugene Roy Balensiefer, II, Seymour, IN (US); Noah Dingler, Waterford, MI (US); Jeff Deboer, Ann Arbor, MI (US); Philip W. Burbrink, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/860,087

(22) Filed: Jun. 3, 2004

(65) Prior Publication Data

US 2004/0245822 A1    Dec. 9, 2004

Related U.S. Application Data

(60) Provisional application No. 60/535,215, filed on Jan. 9, 2004, provisional application No. 60/475,591, filed on Jun. 4, 2003.

(51) Int. Cl.
*A47D 1/10* (2006.01)

(52) U.S. Cl. ............... 297/256.14; 297/256.14; 297/256.13

(58) Field of Classification Search ............ 297/250.1, 297/256.16, 256.14, 256.13, 256.1
See application file for complete search history.

(56) References Cited

U.S. PATENT DOCUMENTS

| | | | | | |
|---|---|---|---|---|---|
| 4,164,357 | A | * | 8/1979 | Conachey | 297/256.1 |
| 4,275,923 | A | * | 6/1981 | Molnar | 297/250.1 |
| 4,750,783 | A | * | 6/1988 | Irby et al. | 297/256.16 |
| 5,277,472 | A | * | 1/1994 | Freese et al. | 297/130 |
| 5,385,387 | A | * | 1/1995 | Kain | 297/256.16 |
| 5,478,135 | A | * | 12/1995 | Kain | 297/256.16 |
| 5,567,008 | A | * | 10/1996 | Cone, II | 297/256.16 |
| 5,997,086 | A | * | 12/1999 | Gibson et al. | 297/256.16 |
| 6,000,753 | A | | 12/1999 | Cone, II | |
| 6,139,101 | A | | 10/2000 | Berringer et al. | |
| 6,193,312 | B1 | * | 2/2001 | Yoshida et al. | 297/256.16 |
| 6,299,249 | B1 | * | 10/2001 | Mori | 297/256.13 |
| 6,322,143 | B1 | * | 11/2001 | Kassai et al. | 297/250.1 |
| 6,428,100 | B1 | | 8/2002 | Kain et al. | |
| 6,491,343 | B1 | * | 12/2002 | Yamazaki | 297/250.1 |
| 6,554,358 | B1 | | 4/2003 | Kain | |

* cited by examiner

*Primary Examiner*—Milton Nelson, Jr.
(74) *Attorney, Agent, or Firm*—Barnes & Thornburg LLP

(57) ABSTRACT

A booster seat includes a high back juvenile seat configured to mount on a tiltable base. By adjusting the tilting orientation of the base relative to an underlying vehicle seat, a caregiver can control the orientation of the high back juvenile seat relative to the underlying vehicle seat.

38 Claims, 10 Drawing Sheets

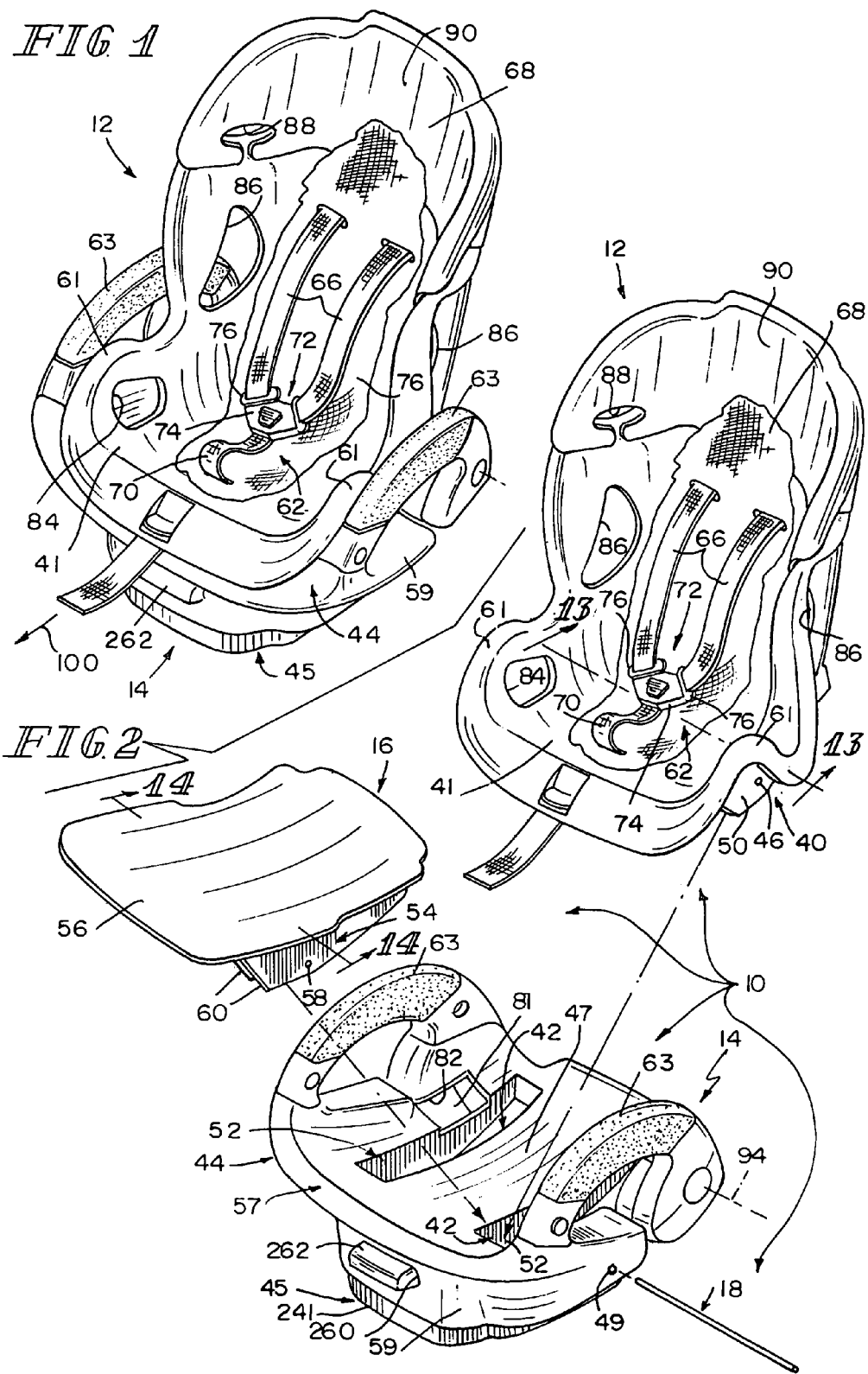

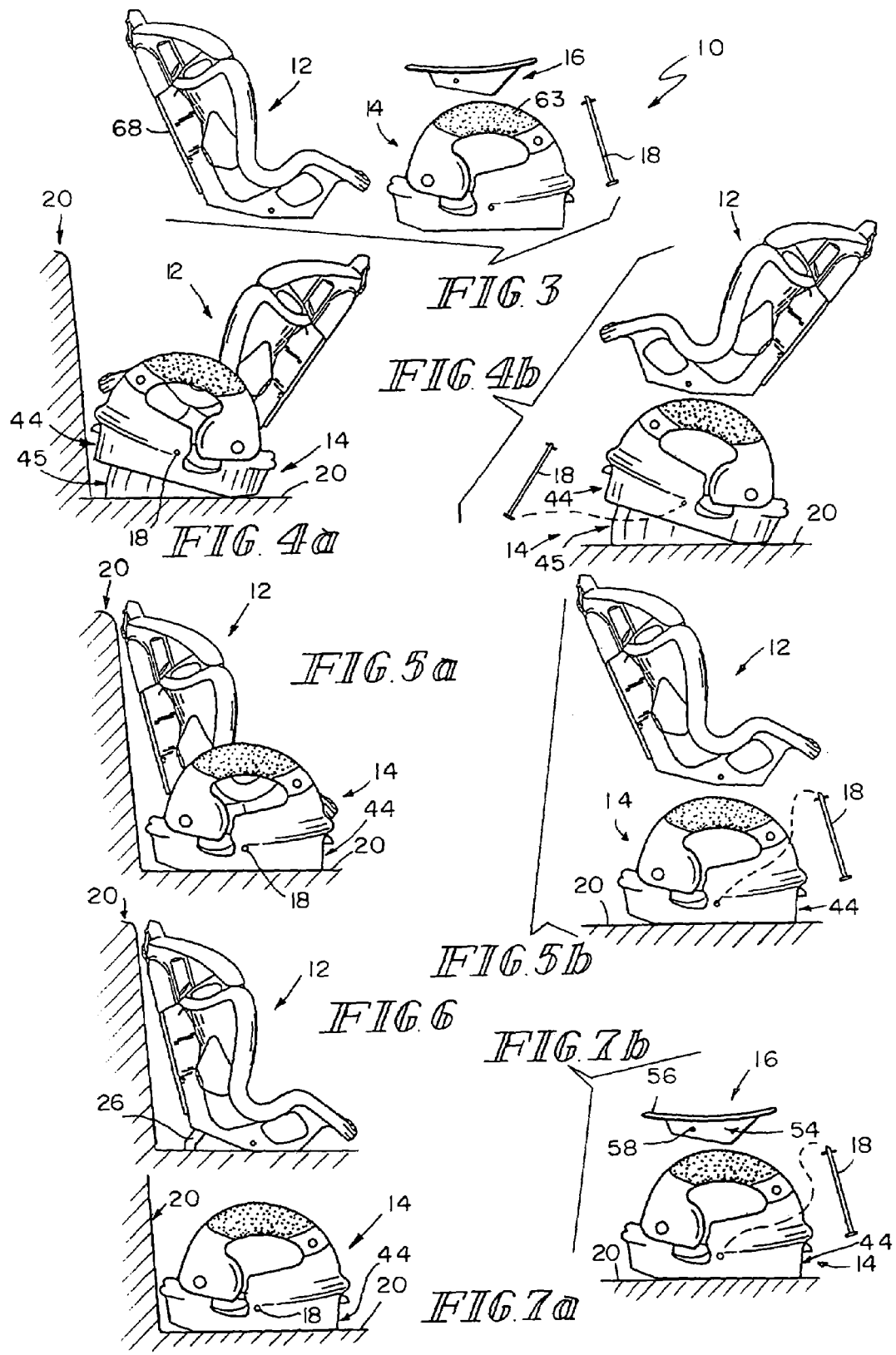

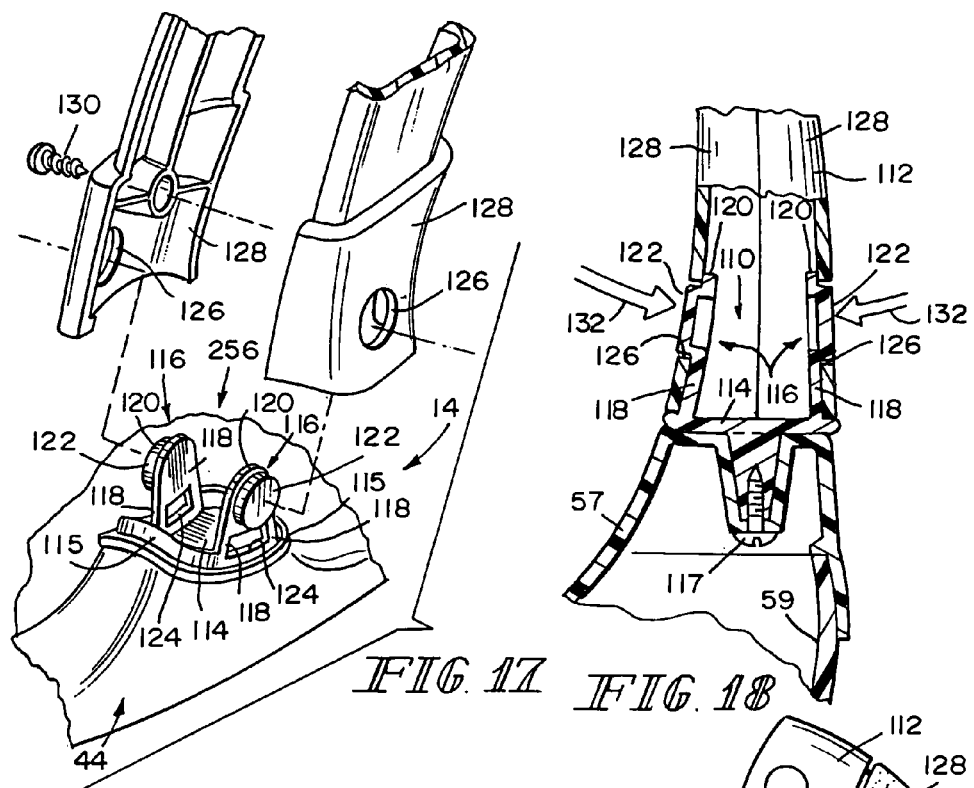
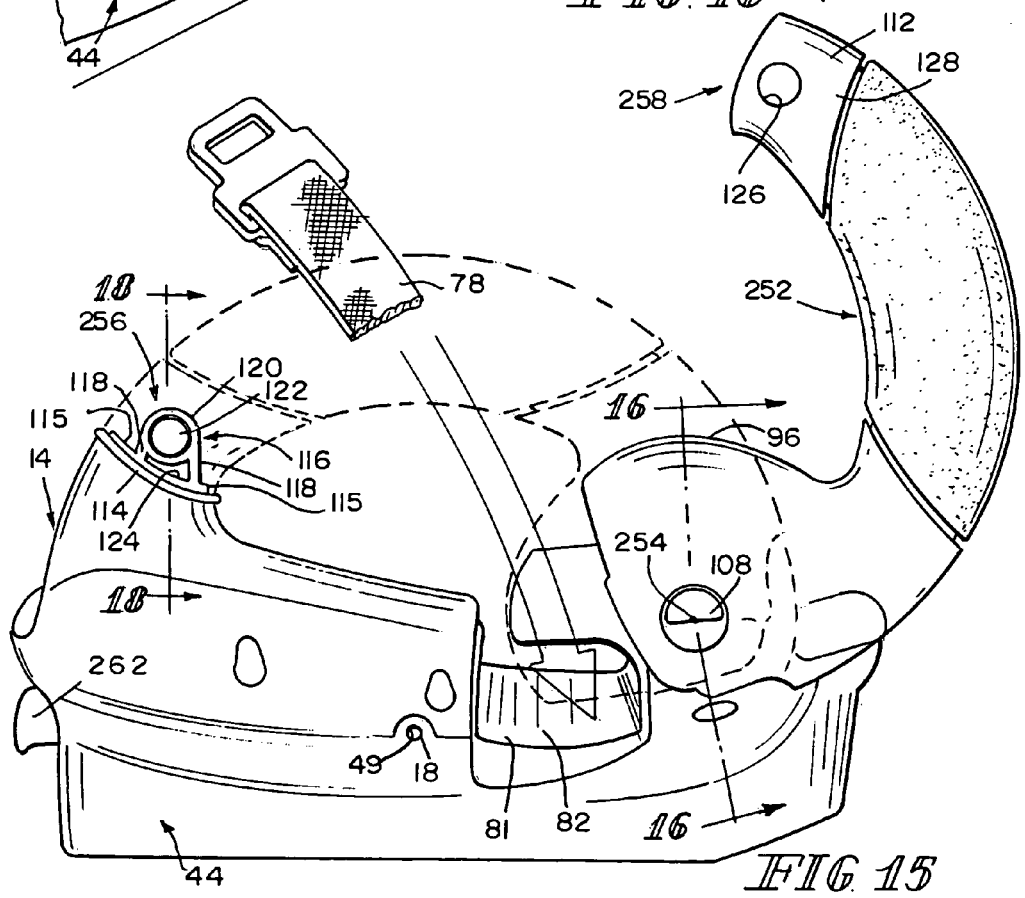

US 7,090,294 B2

JUVENILE VEHICLE BOOSTER SEAT KIT

This application claims priority under 35 U.S.C. § 119(e) to U.S. Provisional Application Ser. No. 60/475,591, filed Jun. 4, 2003 and U.S. Provisional Application Ser. No. 60/535,215, filed Jan. 9, 2004, both of which are expressly incorporated by reference herein.

BACKGROUND

The present disclosure relates to a juvenile booster seat, and particularly to a seat base that mounts and supports a juvenile seat on a seat in a vehicle. More particularly, the present disclosure relates to a seat base configured to tilt to orient a juvenile seat mounted on the seat base in a desired manner.

Juvenile seats are widely used to transport young children in automobiles and other vehicles. An infant vehicle seat with tiltable base is disclosed in U.S. Pat. No. 6,554,358, which patent is hereby incorporated by reference herein.

SUMMARY

In accordance with the present disclosure, a booster seat kit includes a tiltable base, a high back juvenile seat, a juvenile saddle, and a retainer rod. These components are capable of being assembled in the field by a caregiver at a vehicle in a first way to produce a rearwardly facing reclined "infant" booster seat, a second way to produce a forwardly facing "high back" juvenile booster seat, and a third way to produce a forwardly facing "backless" juvenile booster seat. The tiltable base includes a seat support configured to carry either the high back juvenile seat or the juvenile saddle and a support foundation coupled to the seat support for pivotable movement about a pivot axis and adapted to set on an underlying seat in the caregiver's vehicle.

In an illustrative embodiment, the seat support of the tiltable base includes a seating surface and a pair of armrests extending upwardly from the seating surface. The high back juvenile seat includes a seat bottom carrying a pair of armrests and a seat back extending upwardly from the seat bottom. The high back juvenile seat is mounted on the seating surface of the seat support to cause the juvenile seat armrests to lie nested in a space between the armrests of the tiltable base.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a high back juvenile seat made using a booster seat kit in accordance with the present disclosure and mounted on a tiltable base and nested between armrests included in the tiltable base;

FIG. 2 is an exploded perspective assembly view of an unassembled booster seat kit comprising a tiltable base, a "high back" juvenile seat adapted to be retained in either forwardly or rearwardly facing positions on a seat support included in the base using a retainer rod adapted to slide through apertures formed in the base and seat as shown, for example, in FIG. 13, and a "backless" juvenile saddle configured to provide an alternative to the high back juvenile seat and also adapted to be retained in a mounted position on the seat support included in the base using that retainer rod as shown, for example, in FIG. 14;

FIGS. 3–7 show how components included in the juvenile vehicle booster seat kit of FIG. 2 can be assembled in different ways at the option of a caregiver to produce different seating modes;

FIG. 3 is an exploded side elevation view of the unassembled booster seat kit;

FIG. 4a is a side elevation view showing the high back juvenile seat mounted on the tiltable base (after the base has been configured to assume a "tilted" orientation) so that the seat faces rearwardly toward a vehicle seat back and is tilted forwardly for use in a first child-support mode to support an infant on the seat;

FIG. 4b is a side elevation view of the components of the kit used to establish the first child-support mode, those components including the rearwardly-facing high back juvenile seat, "tilted" tiltable base, and retainer rod;

FIG. 5a is a side elevation view showing the high back juvenile seat mounted on the tiltable base (after the base has been configured to assume a "leveled" orientation) so that the seat faces forwardly away from a vehicle seat back and is generally upright for use in a second child-support mode to support a smaller child on the seat;

FIG. 5b is a side elevation view of the components of the kit used to establish the second child-support mode, those components including the forwardly-facing high back juvenile seat, "leveled" tiltable base, and retainer rod;

FIG. 6 is a side elevation view showing the high back juvenile seat for use on a vehicle seat by itself (without the tiltable base) in a third child-support mode to support a child of intermediate size on the seat;

FIG. 7a is a side elevation view showing the backless juvenile saddle mounted on the leveled tiltable base for use in a fourth child-support mode to support a larger child on the backless juvenile saddle;

FIG. 7b is a side elevation view of the components of the kit used to establish the fourth child-support mode, those components including the backless juvenile saddle, leveled tiltable base, and retainer rod;

FIG. 15 is a side elevation view of the tiltable base of FIG. 2 showing the armrest included in the tiltable base after it has been pivoted from a closed position (shown in phantom) to assume an opened position (shown in solid) to allow a user to pass a lap belt through a belt receiver notch formed in the seat support of the tiltable base;

FIG. 17 is an enlarged perspective view of a system for latching the free end of the armrest to a portion of the seat support to retain the armrest in the closed position; and FIG. 18 is a sectional view taken along line 18—18 of FIG. 15 when the armrest is in the closed position.

DETAILED DESCRIPTION OF THE DRAWINGS

Figure 8:
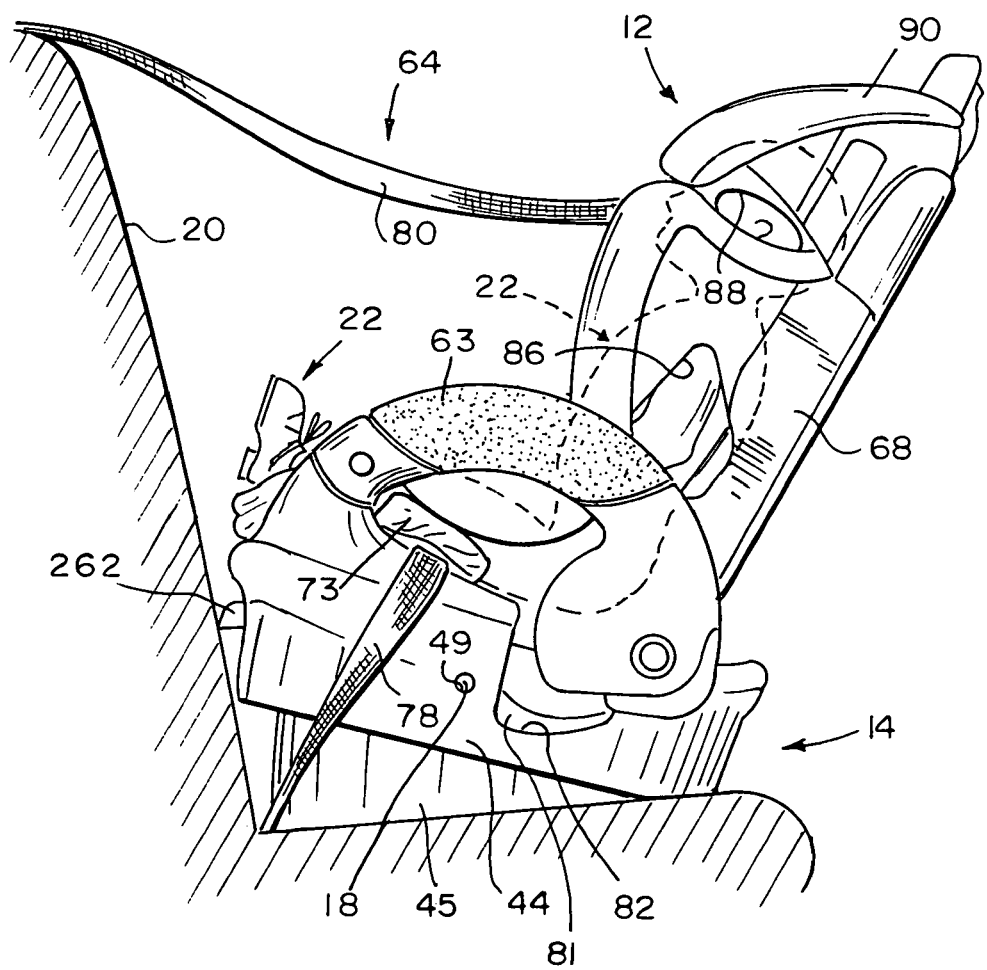
FIG. 8 is an enlarged side elevation view (similar to FIG. 4a) showing the high back juvenile seat mounted on the tilted tiltable base in the first child-support mode to support an infant in a rearwardly facing, tilted orientation on a vehicle seat.

Component parts of a juvenile vehicle booster seat kit 10 are shown, for example, in FIGS. 1–3. Kit 10 comprises the combination of a high back juvenile seat 12, a tiltable base 14, a backless juvenile saddle 16, and a retainer rod 18. These component parts are capable of being assembled "in the field" by a caregiver to produce four different seating configurations (i.e., modes): (1) a first child-support mode suggested, for example, in FIGS. 4a, 4b, and 8 to support an infant; (2) a second child-support mode suggested, for example, in FIGS. 5a, 5b, and 9 to support a smaller child; (3) a third child-support mode suggested, for example, in FIGS. 6 and 10 to support a child of intermediate size; and (4) a fourth child-support mode suggested, for example, in FIGS. 7a, 7b, and 11 to support a larger child.

A tiltable base 14 comprises seat support 44 and support foundation 45. Tiltable base 14 is adjustable to support a juvenile seat 12 in a desired position as shown in FIGS. 1, 2, and 12. Tilting operation of base 14 is shown, for example, in FIGS. 8, 9, and 11 to illustrate movement of a seat support 44 (adapted to carry juvenile seat 12 thereon) relative to an underlying support foundation 45 from a "lowered" position shown in FIG. 9 to a "raised" position shown in FIGS. 8 and 11. Tiltable base 14 can be adjusted by a caregiver to assume, for example, one of the foregoing "tilt" orientations to place juvenile seat 12 in a somewhat "level" or desired orientation regardless of the angle of inclination of the vehicle seat 20 underlying tiltable base 14. It is within the scope of this disclosure to provide any number of predetermined orientations of seat support 44 relative to support foundation 45 in lieu of the two or three orientations disclosed herein.

Figure 9:
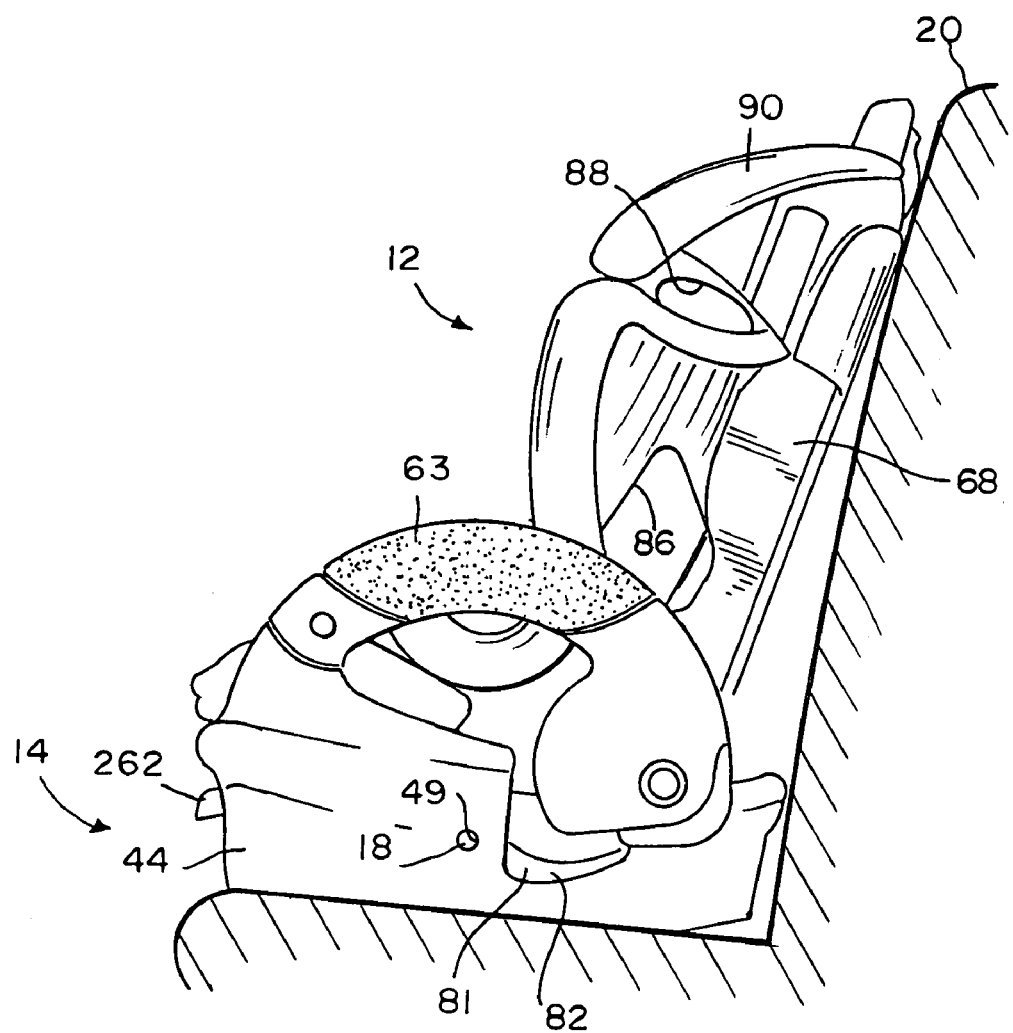
FIG. 9 is enlarged side elevation view (similar to FIG. 5a) showing the high back juvenile seat mounted on the leveled tiltable base in the second child-support mode to support a smaller child in a forwardly facing, generally upright orientation on an automobile seat.

In the illustrated embodiment, seat support 44 is "tiltable" about a rear pivot axis 220 (see FIG. 12) relative to support foundation 45 as suggested in FIGS. 8 and 9 and configured to carry either juvenile seat 12 or juvenile saddle 16 on a seating surface 47 provided on seat support 44 at the option of a user as suggested in FIG. 2. Juvenile seat 12 is adapted to mount on tiltable seat support 44 to lie in a forward-facing position as shown in FIG. 5a or in a rearward-facing position as shown in FIG. 4a. By adjusting the "tilt angle" of seat support 44 relative to support foundation 45, it is possible to vary orientation of juvenile seat 12 on seat support 44 from an "upright" orientation to a "reclined" orientation regardless of the angle of inclination of underlying vehicle seat 20.

Retainer rod 18 shown in FIGS. 2 and 12 is sized and arranged to pass through apertures formed in seat support 44 of tiltable base 14 and in feet 40, 54 included, respectively, in juvenile seat 12 or saddle 16 to retain juvenile seat 12 or saddle 16 in place on seat support 44. Means, such as flexible retainer tabs (not shown) are provided in a tiltable base 14 for retaining retainer rod 18 in place following assembly of the components used to produce tiltable base 14.

Seat 12, base 14, and retainer rod 18 or other suitable retainer are combined to establish the first child-support mode as suggested, for example, in FIGS. 4a, 4b, and 8. Base 14 is placed on a vehicle seat 20 and adjusted to a tilted position. Seat 12 is mounted on tilted base 14 so that seat 12 faces rearwardly and is tilted. Retainer rod 18 (provided in kit 10) is used to couple seat 12 and base 14 to one another so that seat 12 is retained on base 14. An infant 22 can be placed on seat 12 so that infant 22 faces rearwardly and is somewhat reclined as suggested in FIG. 8. The first child-support mode is useful for supporting an infant weighing, for example, between about 5 lbs. (2.3 kg) and about 35 lbs. (15.9 kg).

Seat 12, base 14, and retainer rod 18 are also combined to establish the second child-support mode as suggested, for example, in FIGS. 5a, 5b, and 9. Base 14 is reversed relative to its orientation in the first child-support mode. Base 14 is placed on vehicle seat 20 and adjusted to a "leveled" orientation. Seat 12 is mounted on leveled base 14 so that seat 12 faces forwardly and assumes a generally upright orientation. Retainer rod 18 is used to couple seat 12 and base 14 to one another so that seat 12 is retained on base 14. A smaller child 24 shown, for example, in FIG. 13, can be placed on seat 12 so that smaller child 24 faces forwardly and is generally upright. The second child-support mode is useful for supporting a child 24 weighing, for example, between about 20 lbs. (9.1 kg) and about 40 lbs. (18.1 kg).

Figure 10:
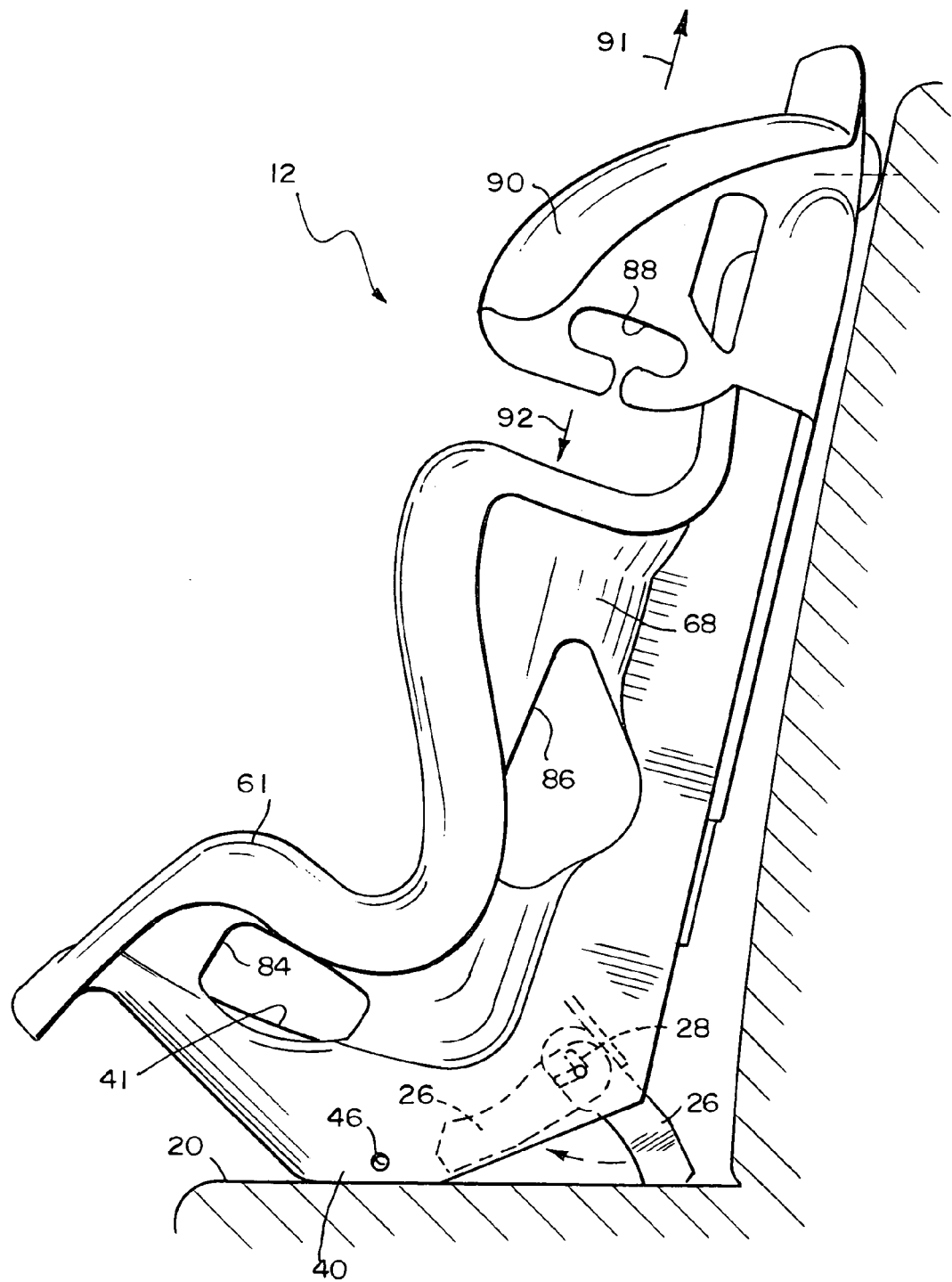
FIG. 10 is an enlarged side elevation view (similar to FIG. 6) showing the high back juvenile seat used without the tiltable base in the third child-support mode to support a child of intermediate size in a forwardly facing, generally upright orientation on an automobile seat.

Seat 12 is used without the other components of kit 10 to establish the third child-support mode, as suggested, for example, in FIGS. 6 and 10. Seat 12 is placed on vehicle seat 20 and support legs 26 coupled to a leg mount 28 are pivoted from retracted, storage positions shown, for example, in phantom in FIG. 10 to extended, use positions shown, for example, in solid in FIG. 10 for engagement with a vehicle seat 20 to prop seat 12 up in a forwardly-facing, generally upright orientation. Each support leg 26 is pivoted to assume the retracted, storage position for placement of seat 12 on base 14 in the first child-support mode and the second child-support mode. A child (not shown) of intermediate size can be placed on seat 12 so that the child faces forwardly and is generally upright. The third intermediate child-support mode is useful for providing a high back juvenile vehicle booster seat to support a child weighing, for example, between about 40 lbs. (18.1 kg) and about 100 lbs. (45.4 kg). Seat 12 can also be placed on vehicle seat 20 to face rearwardly when seat 12 is used without the other components of kit 10.

Figure 11:
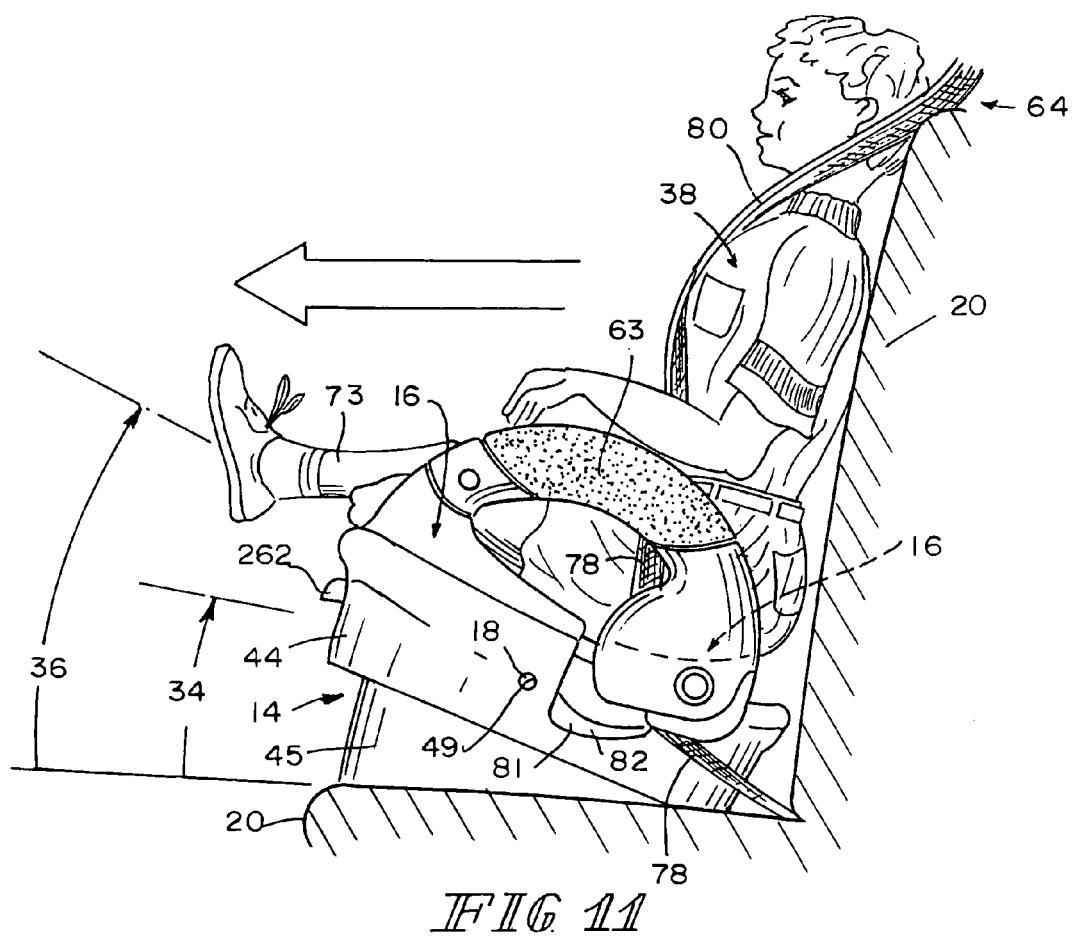
FIG. 11 is an enlarged side elevation view (similar to FIG. 7a) showing the backless juvenile saddle mounted on the tilted tiltable base used in the fourth child-support mode to support a larger child in a forwardly facing, generally upright orientation on a vehicle seat.
Figure 12:
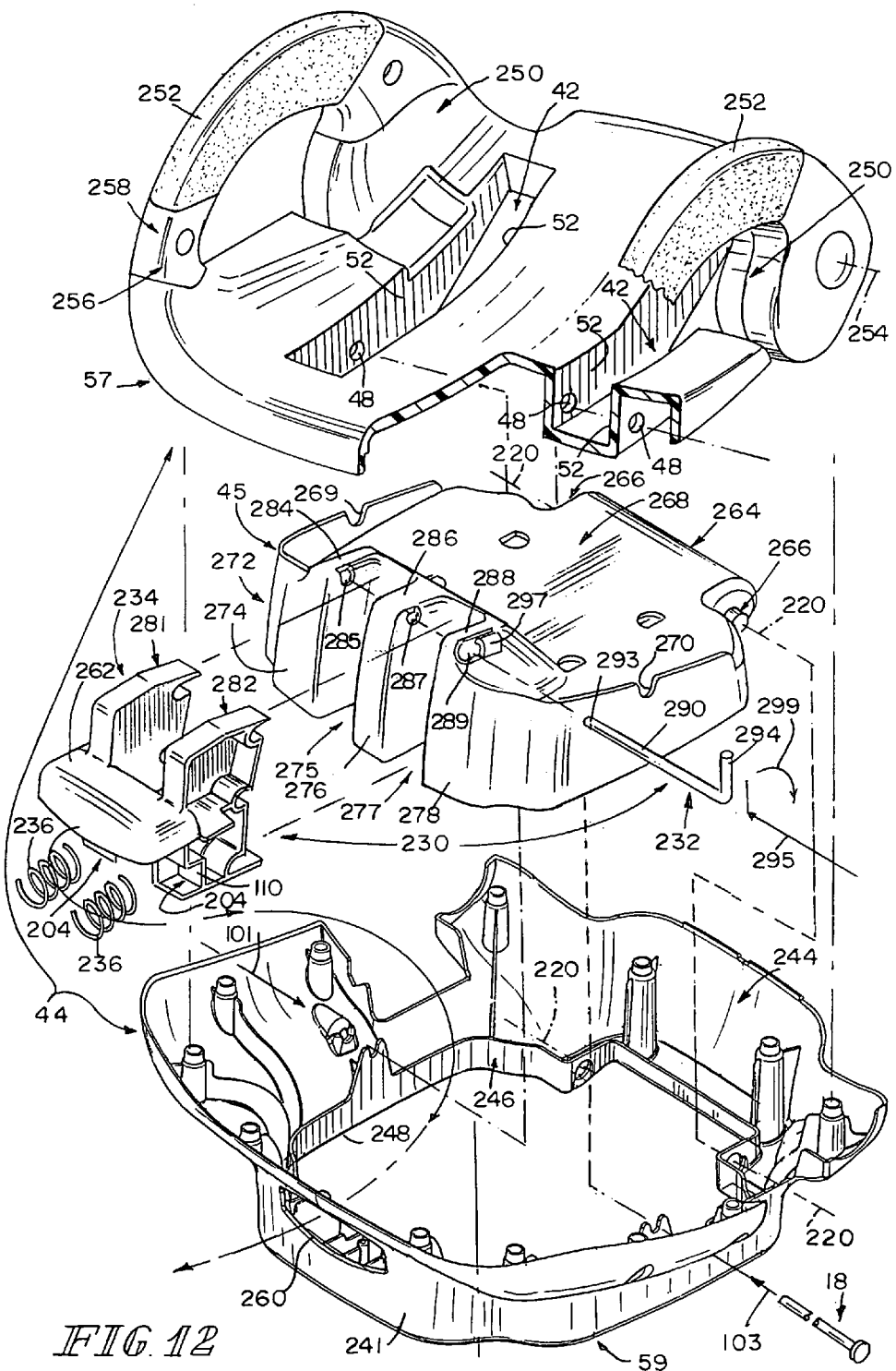
FIG. 12 is an enlarged exploded assembly view of several components included in the tiltable base of the present vehicle booster seat kit showing a seat support including an upper and lower shell, a support foundation configured to be mounted in the seat support, an actuator including a pull handle and two fastener arms cantilevered to the pull handle and sized to fit into two channels formed in the support foundation and an L-shaped anchor including an anchor rod adapted to mount on the support foundation and extend through each of the channels, and a pair of springs for yieldably biasing the actuator in a direction toward the support foundation to cause portions of the anchor rod to fit into notches formed in the fastener arms to retain the seat support in a selected tilted position relative to the support foundation.

Base 14, backless juvenile saddle 16, and retainer rod 18 are combined to establish the fourth child-support mode, as suggested, for example, in FIGS. 7a, 7b, and 11. Base 14 is placed on vehicle seat 20 and adjusted to assume either: (1) a leveled position shown, for example, in FIG. 7a; (2) a first tilted position indicated by arrow 34 shown, for example, in FIG. 11; or (3) a second tilted position indicated by arrow 36 shown, for example, in FIG. 11. Saddle 16 is mounted on base 14 and retained thereon using retainer rod 18 provided in kit 10. A larger child 38 shown, for example, in FIGS. 11 and 14 can sit on saddle 16 to face forwardly. The fourth child-support mode is useful for providing a backless juvenile vehicle booster seat to support a child 38 weighing, for example, between about 40 lbs. (18.1 kg) and about 100 lbs. (45.4 kg). It is within the scope of this disclosure to provide a relatively short upwardly extending portion or seat back (not shown) along a rear edge of juvenile saddle 16.

Figure 13:
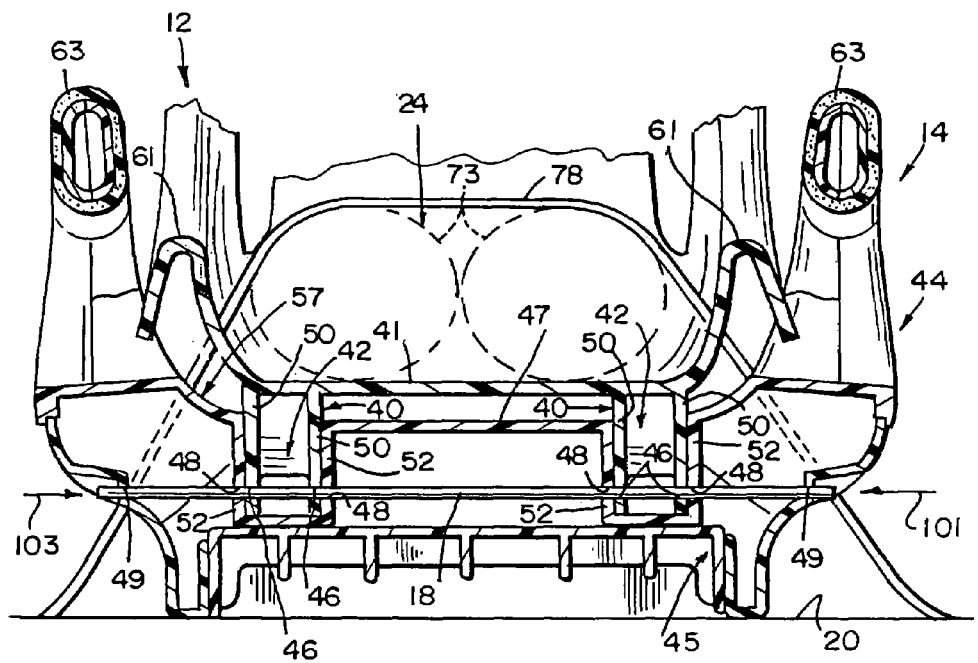
FIG. 13 is an enlarged sectional view taken along line 13—13 of FIG. 1 showing the high back juvenile seat in place on the tiltable base and showing nesting of the high back juvenile seat between armrests included in the tiltable base and showing nesting of two feet on the underside of the juvenile vehicle seat in two companion foot receivers formed in the seat support to orient the high back juvenile seat properly on the seat support and passage of the retainer rod through apertures formed in the feet and seat support to retain the high back juvenile seat in place on the seat support.

High back juvenile seat 12 is coupled to base 14 as shown, for example, in FIG. 13 for use in the first and second child-support modes. Seat 12 includes a pair of spaced-apart feet 40 coupled to and extending downwardly from a seat bottom 41 and a seat back 68 extending upwardly from seat bottom 41. Each foot 40 extends downwardly into and mates with a foot receiver or trough 42 formed in a seat support 44 included in base 14. Each foot receiver is formed to have a top opening in seating surface 57 as shown in FIG. 12. Retainer rod 18 is inserted in one of directions 101 and 103 through a pair of retainer-receiving apertures 46 formed in each foot 40, a pair of retainer-receiving apertures 48 formed in side walls 52 associated with each foot receiver 42, and a pair of retainer-receiving apertures 49 formed in seat support 44 to couple seat 12 and base 14 to one another.

Each foot 40 of high back juvenile seat 12 includes a pair of parallel side walls 50, as shown, for example, in FIG. 13. Each side wall 50 is formed to include one of retainer-receiving apertures 46 as suggested in FIGS. 2 and 13.

Figure 14:
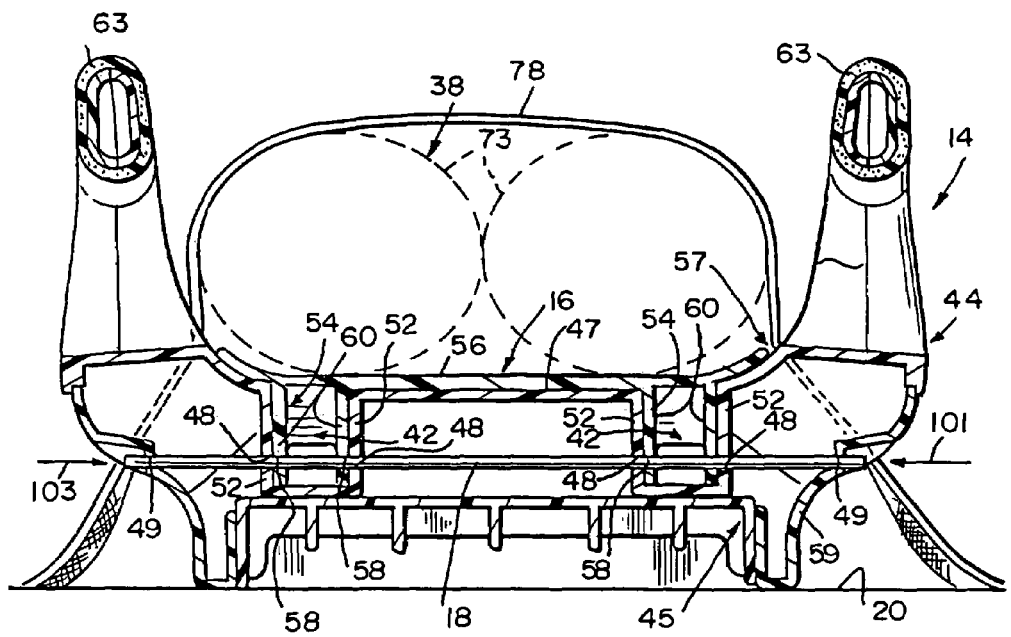
FIG. 14 is an enlarged sectional view similar to FIG. 13 showing the backless juvenile saddle in place on the tiltable base and showing nesting of two feet on the underside of the backless juvenile saddle in the two foot receivers formed in the seat support to orient the backless juvenile saddle properly on the seat support and passage of the retainer rod through apertures formed in the feet and seat support to retain the backless juvenile saddle in place on the seat support.

Each foot receiver 42 is bounded by a pair of parallel walls 52, as shown, for example, in FIGS. 12–14. Each side wall 52 is formed to include one of retainer-receiving apertures 48 as shown, for example, in FIGS. 12 and 14.

Saddle 16 is coupled to base 14 for use in the fourth child-support mode, as shown, for example, in FIG. 14. Saddle 16 includes a pair of spaced-apart feet 54 coupled to and depending from a saddle plate 56 upon which child 38 sits as suggested in FIGS. 2 and 14. Each foot 54 extends into and mates with foot receiver or trough 42 formed in seat support 44 when saddle plate 16 is placed on an upper shell 57. Each foot receiver 42 is formed to have a top opening in seating surface 57 as shown in FIG. 12. Upper shell 57 is coupled to a lower shell 59 using couplers (not shown) to provide seat support 44 as suggested in FIG. 12. Retainer rod 18 is inserted in one of directions 101 and 103 through a pair of receiver-retaining apertures 58 formed in each foot 54 of saddle 16 and retainer-receiving apertures 49 formed in seat support 44 to couple saddle 16 and base 14 to one another as shown, for example, in FIG. 14.

Each foot 54 of saddle 16 includes a pair of parallel side walls 60, as shown, for example, in FIGS. 2 and 14. Each side wall 60 is formed to include one of retainer-receiving apertures 58 as shown in FIG. 14.

High back juvenile seat 12 includes a pair of spaced-apart seat armrests 61 shown, for example, in FIGS. 1, 2, and 13 and tiltable base 14 includes a pair of spaced-apart base armrests 63, as shown, for example, in FIGS. 1, 2, 13, and 14. Seat armrests 61 extend upwardly from seat bottom 41 of high back juvenile seat 12 as shown in FIG. 2. Base armrests 63 extend upwardly from seating surface 47 of upper shell 57 of seat support 44 as shown in FIG. 2. Seat armrests 61 nest between base armrests 63 when seat 12 is placed on base 14 for use in the first and second child-support modes, as shown, for example, in FIGS. 1 and 13.

Retainer rod 18 is fixed in place when it is used either to couple seat 12 and base 14 to one another or to couple saddle 16 and base 14 to one another. A flexible rib (not shown) is coupled to one side of base 14 and another flexible rib (not shown) is coupled to an opposite side of base 14. The ribs cooperate to retain rod 18 in a fixed position when coupling base 14 to either seat 12 or saddle 16. The ribs can be moved or otherwise deformed to allow removal of rod 18 from retainer-receiving apertures 46, 58.

As suggested in FIG. 12, tiltable base 14 includes seat support 44, support foundation 45, and a releasable lock mechanism 230. Releasable lock mechanism 230 comprises an anchor 232 adapted to be mounted on support foundation 45, an actuator 234 adapted to be mounted on seat support 44 for movement between locking positions and lock-releasing positions, and springs 236 arranged to bias actuator 234 to mate with anchor 232 to retain seat support 44 in a selected tilting or non-tilting position relative to support foundation 45.

Seat support 44 includes an upper shell 57 that mates with a lower shell 59 to form an interior region 244 receiving support foundation 45 therein as suggested, for example, in FIG. 12. Lower shell 242 includes a bottom wall 246 formed to include an opening 248 through which support foundation 45 can extend as seat support 44 is moved relative to support foundation 45 from a lowered position as shown in FIG. 9 to tilted positions shown in FIGS. 8 and 11. Fasteners (not shown) are used to retain upper and lower shells 57, 59 in mated relation once releasable lock mechanism 230 and support foundation 45 are located properly in the space provided between upper and lower shells 57, 59.

A seat unit (e.g., high back juvenile seat 12 or juvenile saddle 16) mounted on upper shell 57 to overlie seating surface 47 of upper shell 57 and retainer 18 is coupled to the seat unit and to upper shell 57 to retain the seat unit in a fixed position on tiltable base 14. In the illustrated embodiment, retainer 18 is also coupled to lower shell 59. Each of the seat unit, upper shell 57, and lower shell 59 is formed to include retainer-receiving apertures. Retainer 18 is a rod sized to slide through the retainer-receiving apertures formed in the seat unit, upper shell 57, and lower shell 59 to retain the seat unit in a fixed position on upper shell 57.

The seat unit includes a seat bottom and a foot coupled to the seat bottom and formed to include at least one retainer-receiving aperture through which retainer rod 18 passes. Upper shell 57 is formed to include a foot receiver 242 and the foot in the seat unit extends into foot receiver 242 to establish a selected location of the seat unit relative to upper shell 57 of the tiltable base 14. Upper shell 57 includes a side wall arranged to depend from seating surface 47 of the upper shell 57 to define a boundary of foot receiver 242 and formed to include a retainer-receiving aperture through which the retainer rod 18 passes.

In illustrative embodiments, the seat unit is a high back juvenile seat 12 including a seat back 68 extending upwardly from seat bottom 41 and foot 40 extends downwardly from seat bottom 41 in a direction away from the seat back 68. In other illustrative embodiments, the seat unit is a backless juvenile saddle 16 including a saddle plate 56 and foot 60 is coupled to an underside of the saddle plate 56.

Upper shell 57 is formed (as shown in FIGS. 12 and 15) to include armrest pivot supports 250 for supporting each armrest 252 for pivotable movement about pivot axis 254 and armrest retainers 256 for releasably retaining free ends 258 of each armrest 252 normally in a locked position. Lower shell 59 includes a front panel 241 that is also formed to include a handle-receiving aperture 260 sized to allow movement of a pull handle 262 included in actuator 234 therethrough as suggested, for example, in FIGS. 2, 8, and 12.

As suggested in FIG. 12, support foundation 45 includes a rear portion 264 formed to include a pivot support 266 configured to mate with seat support 44 to establish rear pivot axis 220. Support foundation 44 also includes a middle portion 268 formed to include spaced-apart notches 269, 270 for receiving retainer rod 18 therein as suggested in FIG. 12. Support foundation 45 also includes a front portion 272 configured to carry anchor 232 and mate with actuator 234.

As shown, for example, in FIG. 12, front portion 272 of support foundation 45 includes a first frame member 274 and a channel partition 276 which cooperate to define a first arm-receiving channel 275 therebetween. Front portion 272 also includes a second frame member 278 that cooperates with channel partition 276 to define a second arm-receiving channel 277 therebetween. These channels 275, 277 extend vertically and are sized to receive, respectively, first and second fastener arms 281, 282 of actuator 234 therein during mating engagement of fastener arms 281, 282 and portions of anchor 232. Fastener arms 281, 282 are sized to slide up and down in channels 276, 277 as seat support 44 is pivoted about rear pivot axis 220 to move relative to support foundation 44.

As shown in FIG. 12, in an illustrative embodiment, first rod mount 284 is provided in an upper portion of first frame member 274 and is formed to include a passageway 285 receiving a free end 293 of anchor rod 290 included in anchor 232 therein. A center rod mount 286 is provided in an upper portion of channel partition 276 and is formed to include a passageway 287 receiving a middle portion of anchor rod 290 therein. A second rod mount 288 is provided in an upper portion of second frame member 278 and is formed to include a passageway 289 receiving a proximal portion of anchor rod 290 therein. When anchor 232 is arranged to extend through the passageways formed in mounts 284, 286, 288, then first and second portions of anchor rod 290 traverse portions of first and second arm-receiving channels 275, 277 and are exposed to first and second fastener arms 281, 282 of actuator 234 during movement of those fastener arms 281, 282 into the channels 275, 277.

Anchor 232 includes anchor rod 290 and rod handle 294 and is L-shaped in the illustrated embodiment as shown, for example, in FIG. 12. To mount anchor 232 on support foundation 45, anchor rod 290 is first moved in direction 295 to cause the free end 293 thereof to pass in sequence through passageways 89, 87, and 85 while rod handle 294 is arranged to extend upwardly as suggested in FIG. 12. Then rod handle 294 is moved to mate with a "snap-fit" handle retainer 297 formed in support foundation 45 by rotating anchor rod 290 about a longitudinal axis therethrough in rotary direction 299. It is within the scope of this disclosure to mount anchor 232 on support foundation 45 to communicate with channels 275, 277 and/or mate with fastener arms 281, 282 in other suitable manners. Once anchor rod 290 is mounted on support foundation 45, the exposed first and second traversing channels 276, 277 are arranged to mate with first and second fastener arms 281, 282.

Actuator 234 includes a pull handle 262 and first and second fastener arms 281, 282 coupled (e.g., cantilevered) to an inner end of pull handle 272 as suggested in FIG. 12. Pull handle 262 is configured to be gripped and pulled by a user in a direction 100 (see FIG. 1) away from rear pivot axis 220. Each of fastener arms 281, 282 includes, for example, first, second, and third notches sized to receive the exposed first and second rod portions therein. Each fastener arm 281, 282 also includes a spring receiver 204 for receiving an inner end of spring 236. When assembled, fastener arms 281, 282 and anchor rod 290 are positioned to lie in a space between pull handle 262 and rear pivot axis 220.

Tiltable base 14 is shown in a lowered position in FIG. 9. Initially, the exposed portions of anchor rod 290 fit into a first set of notches formed in spring-biased actuator 234 to retain seat support 44 in this lowered position relative to support foundation 45. To release lock mechanism 230 so that seat support 44 can be tilted about rear pivot axis 220 relative to support foundation 45, a user pulls handle 262 in direction 100 to compress springs 236 between inner walls of spring receivers 204 of actuator 234 and front panel 241 of lower shelf 242 to cause fastener arms 281, 282 to move in direction 100 to disengage anchor rod 290. Then seat support 44 can be pivoted upwardly about rear pivot axis 220 to assume a raised position shown in FIG. 8 wherein anchor rod 290 fits into others of the notches 16 formed in fastener arms 281, 22.

Tiltable base 14 and juvenile saddle 16 can cooperate to provide a backless booster seat for use in a vehicle. Alternatively, tiltable base 14 and juvenile seat 12 can cooperate to provide a forward-facing seat or a rearward-facing seat, depending upon the orientation of juvenile seat 12 on tiltable base 14.

In use, tiltable base 10 (with either juvenile seat 12 or saddle 16 mounted thereon) is placed on top of a seat 20 in a vehicle. Suitable belts are used to retain tiltable base 14 in place on vehicle seat 20 as suggested in FIGS. 8–11.

Vehicle seats in the industry vary in design and may be designed to have a top surface that is substantially horizontal or that is inclined at a certain inclination angle. By tilting seat support 44 relative to support foundation 45 while support foundation 45 is in place on vehicle seat 20, a user may move juvenile seat 12 or saddle 16 to assume a desired orientation on vehicle seat 20.

Once tiltable base 14 is placed on vehicle seat 20, tiltable base 14 can be arranged to assume a desired tilting or non-tilting configuration by pulling handle 262 provided in exposed front portion 272 of support foundation 45, thereby disengaging fastener arms 281, 282 and anchor rod 290. Seat support 44 is now free to pivot about the rear pivot axis 220 relative to support foundation 45 on vehicle seat 20 to selectable positions as shown, for example, in FIGS. 8, 9, and 11.

Support foundation 45 is arranged to extend into interior region 244 of seat support 44 to lie under seating surface 47 and adapted to set on vehicle seat 20. Support foundation 45 is coupled to seat support 44 for pivotable movement about pivot axis 220 relative to seat support 44 in interior region 244 and through a bottom opening 248 formed in lower shell 242 to orient seating surface 47 of seat support 44 to lie in a desired position regardless of the inclination of vehicle 20 underlying support foundation 45.

A high back juvenile seat harness system 62 shown, for example, in FIGS. 1 and 2 and a vehicle harness system 64 shown, for example, in FIGS. 8 and 11 can be used to restrain an occupant of high back juvenile seat 12. Seat harness system 62 includes a pair of seat shoulder straps 66 coupled to a seat back 68 included in seat 12, a crotch strap 70 coupled to seat bottom 41, and a buckle unit 72. Seat shoulder straps 66 are adapted to lie across the shoulders of a seat occupant. Crotch strap 70 is adapted to extend upwardly from seat bottom 41 and between the legs 73 of the seat occupant. A latch receiver 74 included in buckle unit 72 and coupled to crotch strap 70 is configured to receive a latch 76 coupled to each shoulder strap 66 to interconnect crotch strap 70 and shoulder straps 66.

Vehicle harness system 64 includes a vehicle lap belt 78 and a vehicle shoulder strap 80, as shown, for example, in FIGS. 8, 11, and 13–15. Base 14 includes a pair of inserts 81 formed to include base lap belt apertures 82 on opposite sides of base 14 under base armrests 63. Foot receivers 42 are located between the two spaced-apart base lap belt receivers 82 provided in tiltable base 14. Seat armrests 61 are formed to include seat lap belt apertures 84. Base lap belt apertures 82 are adapted to receive lap belt 78 therethrough when kit 10 is used in the second and fourth child-support modes. Seat lap belt apertures 84 are adapted to receive lap belt 78 therethrough when kit 10 is used in the first, second, and third child-support modes.

Seat 12 is formed to include a pair of lower vehicle shoulder strap apertures 86 and a pair of upper vehicle shoulder strap apertures 88, as shown, for example, in FIGS. 1 and 2. Lower vehicle shoulder strap apertures 86 are formed in seat back 68 on opposite sides thereof. Upper vehicle shoulder strap apertures 88 are formed in an adjustable headrest 90 coupled to seat back 68 for movement toward and away from seat back 68 as indicated by direction arrows 91, 92 shown, for example, in FIG. 10. Each aperture 86, 88 is adapted to receive vehicle shoulder strap 80 for extension across the seat occupant and through a seat lap belt aperture 84 in the first, second, and third modes and through a base lap belt aperture 82 in the second and fourth modes. Lower vehicle shoulder strap apertures 86 are useful with smaller seat occupants and upper vehicle shoulder strap apertures 88 are useful with larger seat occupants.

Each base armrest 63 is coupled to seat support 44 for pivotable movement relative thereto about a pivot axis 254, as suggested, for example, in FIG. 15. Base armrest 63 is arranged for pivotable movement on a pivot axle 98 (see FIG. 16) between a closed armrest position (as shown in phantom in FIG. 15) and an opened belt-receiving position (as shown in solid in FIG. 15) to facilitate insertion of lap belt 78 into base lap belt aperture 82 and removal of lap belt 78 therefrom.

Figure 16:
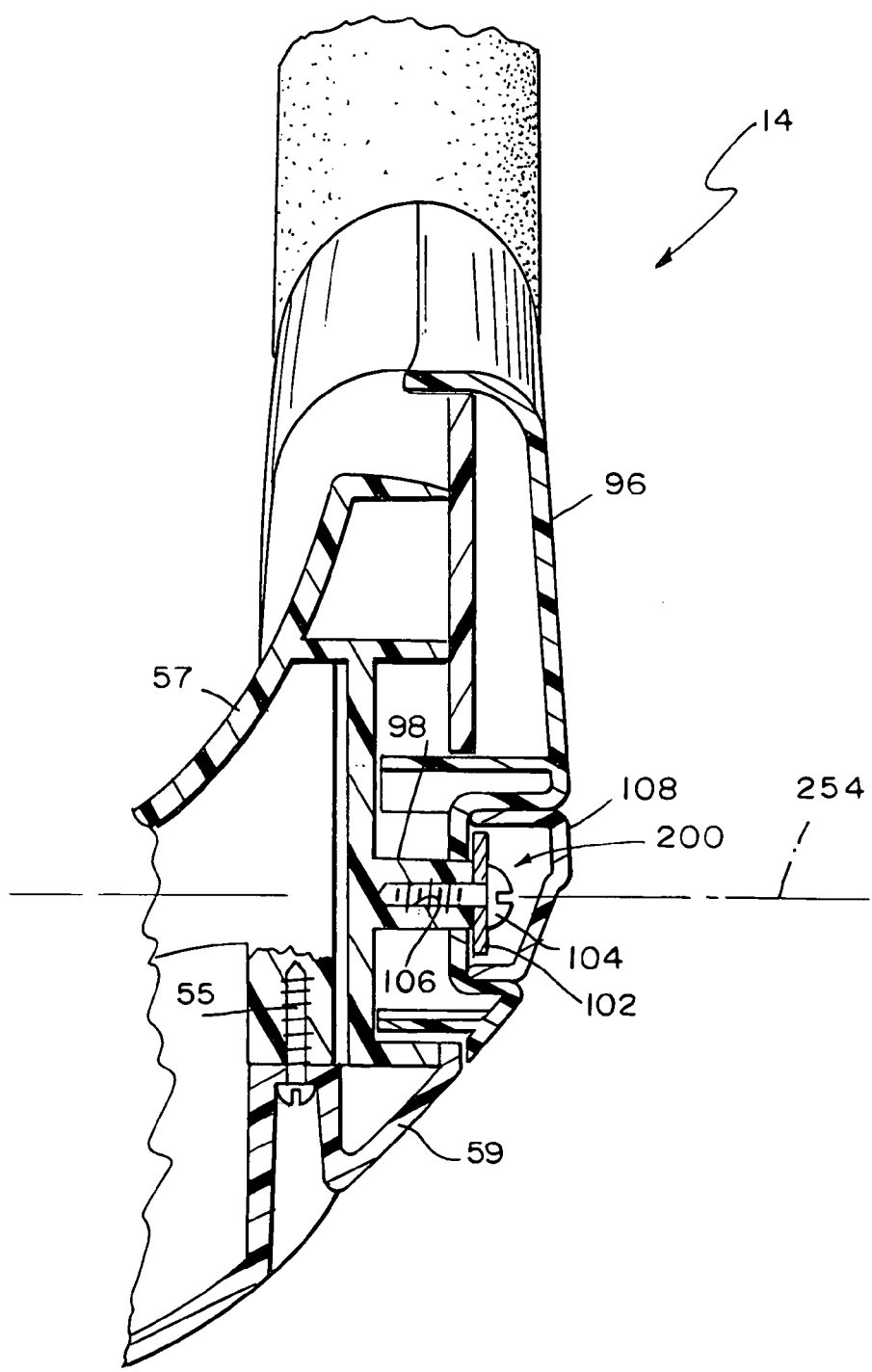
FIG. 16 is a sectional view taken along line 16—16 of FIG. 15.

A proximal end 96 of base armrest 63 is mounted for pivotable movement on a pivot axle 98 that is included in upper shell 57, as shown, for example, in FIG. 16. An armrest retainer 200 retains proximal end 96 on pivot axle 98. Retainer 200 includes a washer 102 and a coupler 104 coupled to a bore 106 formed in pivot axle 98. A retainer cover 108 covers washer 102 and coupler 104. Pivot axle 98 extends through coupler 104 and bore 106.

Seat support 44 includes a pair of armrest retainers or locks 256, as shown, for example, in FIGS. 15, 17, and 18. Each armrest retainer 256 is arranged to engage a free, distal end 112 of a base armrest 63 to lock armrest 63 in the closed position and to release distal end 112 to allow pivotable movement of armrest 63 about pivot axis 254 between the closed armrest position and the opened belt-receiving position.

Illustratively, armrest retainer or lock 256 includes a latch mount 114 and a pair of spaced-apart flexible latches 116, as shown, for example, in FIGS. 15, 17, and 18. Latch mount 114 is fixed to upper shell 57 using a coupler 117. A pair of walls 115 mate with and is surrounded by distal end 112 when armrest 63 is positioned in the closed position. Latches 116 are cantilevered to and extend upwardly from latch mount 114.

Each latch 116 includes a pair of latch arms 118, a disk-shaped lug mount 120, and a lug 122, as shown, for example, in FIGS. 15, 17, and 18. Arms 118 are cantilevered to latch mount 114 and are spaced apart from one another to provide an aperture 124 therebetween to promote flexibility of latch 116. Lug mount 120 is coupled to arms 118. Lug 122 is coupled to and extends outwardly from lug mount 120.

Lug 122 is arranged to extend into a lock aperture 126 formed in an armrest portion 128 included in armrest 63 to lock armrest 63 in the closed position, as shown, for example, in FIG. 18. Armrest portions 128 are coupled to one another by a coupler 130 shown, for example, in FIG. 17.

A release force (represented by arrow 132), shown diagrammatically, for example, in FIG. 18 is applied to each lug 122 to release lug 122 from lock aperture 126 to allow armrest 63 to pivot from the closed armrest position to the opened belt-receiving position. Application of release force 132 to lugs 122 causes lugs 122 to move toward one another and out of lock apertures 126. Latch arms 118 flex in response to application of release force 132 to lugs 122 to allow such movement of lugs 122. When release force 132 is removed from lugs 122, latch arms 118 move lugs 122 away from one another automatically.

The invention claimed is:

1. A booster seat kit including components capable of being assembled in the field in a first way to produce a rearwardly facing reclined infant booster seat, a second way to produce a forwardly facing high back juvenile booster seat, and a third way to produce a forwardly facing backless juvenile booster seat, the booster seat kit comprising a tiltable base, adjustable to assume one of a tilted configuration and a leveled configuration, a high back juvenile seat, a juvenile saddle, and a retainer rod, wherein the high back juvenile seat is mounted on the tiltable base in a first position to assume a rearwardly facing orientation upon adjustment of the tiltable base to assume the tilted configuration and retained in that rearwardly facing orientation by coupling the retainer rod to the tiltable base and to the high back juvenile seat while the high back juvenile seat is mounted in the first position on the tiltable base to produce a rearwardly facing reclined infant booster seat, wherein the high back juvenile seat is mounted on the tiltable base in a second position to assume an opposite forwardly facing orientation upon adjustment of the tiltable base to assume the leveled configuration and retained in that forwardly facing orientation by coupling the retainer rod to the tiltable base and to the high back juvenile seat while the high back juvenile seat is mounted in the second position on the tiltable base to produce a forwardly facing high back juvenile booster seat, and wherein the juvenile saddle is mounted on the tiltable base upon adjustment of the tiltable base to assume one of a leveled and tilted configuration and retained thereon by coupling the retainer rod to the tiltable base and to the juvenile saddle while the juvenile saddle is mounted on the tiltable base to produce a forwardly facing backless juvenile booster seat.

2. The booster seat kit of claim 1, wherein the tiltable base includes a seat support adapted to carry a seated child, a support foundation coupled to the seat support for pivotable movement about a pivot axis relative to the seat support between a first position establishing the tilted configuration and a second position establishing the leveled position, and a pair of armrests coupled to the seat support and arranged to lie in spaced-apart relation to one another to define therebetween a seating surface on the seat support, and wherein the high back juvenile seat is mounted on the seating surface on the seat support to lie between the pair of armrests coupled to the seat support.

3. The booster seat of claim 2, wherein the high back juvenile seat includes a seat bottom arranged to overlie the seating surface, a seat back extending upwardly from the seat bottom, and a pair of armrests extending upwardly from the seat bottom and arranged to lie in a space located between the armrests provided in the tiltable base and coupled to the seat support.

4. The booster seat kit of claim 2, wherein the high back juvenile vehicle seat is mounted on the seating surface and formed to include a retainer-receiving aperture, the seat support is also formed to include a retainer-receiving aperture, and the retainer rod is arranged to extend through the retainer-receiving apertures formed in the seat bottom and seat support to anchor the seat bottom to the seat support.

5. The booster seat kit of claim 4, wherein the high back juvenile vehicle seat includes a seat bottom arranged to overlie the seating surface and a foot extending downwardly from the seat bottom into a foot receiver formed in the seat support and the retaining rod extends through a retainer-receiving aperture formed in the foot.

6. The booster seat kit of claim 2, wherein the juvenile saddle includes a backless saddle plate arranged to overlie the seating surface and a foot extending downwardly from the backless saddle plate into a foot receiver formed in the seat support and the retainer rod is arranged to extend through retainer-receiving apertures formed in the foot and seat support to anchor the backless saddle plate to the seat support in a space located between the armrests provided in the tiltable base and coupled to the seat support.

7. The booster seat kit of claim 2, wherein the tiltable base further includes a first armrest pivot support coupled to a rear side portion of the seat support to lie adjacent to the seating surface and a first of the armrests is mounted on the first armrest pivot support for movement about a pivot axis between a closed armrest position and an opened belt-receiving position to facilitate passage of a seat lap belt through a space located between the seating surface and the first armrest.

8. The booster seat kit of claim 7, wherein the tiltable base further includes a first armrest retainer coupled to a forward side portion of the seat support to lie adjacent to the seating surface and the first of the armrests includes a proximal end pivotably coupled to the first armrest pivot support and an opposite free end configured to mate with the first armrest retainer upon movement of the first of the armrests to the closed armrest position to retain the first of the armrests in the closed armrest position.

9. The booster seat kit of claim 1, wherein each of the tiltable base, high back juvenile seat, and juvenile saddle is formed to include retainer-receiving apertures and the retainer rod is arranged to pass through retainer-receiving apertures formed in the tiltable base and high back juvenile seat when the high back juvenile seat is mounted on the tiltable base in one of the first and second positions and the retainer rod is arranged to pass through retainer-receiving apertures formed in the tiltable base and the juvenile saddle when the juvenile saddle is mounted on the tiltable base.

10. The booster seat kit of claim 9, wherein the high back juvenile seat includes a seat bottom arranged to engage the seat support and a foot extending downwardly from the seat bottom into a foot receiver formed in the seat support and the foot is formed to include one of the retainer-receiving apertures through which the retainer rod passes.

11. The booster seat kit of claim 9, wherein the juvenile saddle includes a saddle plate and a foot extending downwardly from the saddle plate into a foot receiver formed in the seat support and the foot is formed to include one of the retainer-receiving apertures through which the retainer rod passes.

12. The booster seat kit of claim 1, wherein the tiltable base includes a seat support including an upper shell including a seating surface and a lower shell arranged to cooperate with the upper shell to form an interior region under the seating surface, and a support foundation arranged to extend into the interior region of the seat support to lie under the seating surface and adapted to set on a vehicle seat, the support foundation being coupled to the seat support for pivotable movement about a pivot axis relative to the seat support in the interior region and through a bottom opening formed in the lower shell to orient the seating surface of the seat support to lie in a desired position regardless of the inclination of the vehicle seat underlying the support foundation, and each of the upper and lower shells is formed to include retainer-receiving apertures and the retainer rod is sized and arranged to pass through retainer-receiving apertures formed in the upper and lower shells and in the high back juvenile seat to retain the high back juvenile seat in one of the first and second positions on the upper shell of the seat support.

13. The booster seat kit of claim 1, wherein the tiltable base includes a seat support including an upper shell including a seating surface and a lower shell arranged to cooperate with the upper shell to form an interior region under the seating surface, and a support foundation arranged to extend into the interior region of the seat support to lie under the seating surface and adapted to set on a vehicle seat, the support foundation being coupled to the seat support for pivotable movement about a pivot axis relative to the seat support in the interior region and through a bottom opening formed in the lower shell to orient the seating surface of the seat support to lie in a desired position regardless of the inclination of the vehicle seat underlying the support foundation, and each of the upper and lower shells is formed to include retainer-receiving apertures and the retainer rod is sized and arranged to pass through retainer-receiving apertures formed in the upper and lower shells and in the juvenile saddle to retain the juvenile saddle on the upper shell of the seat support.

14. A booster seat for supporting a child in a seated position in a vehicle, the booster seat comprising a tiltable base including
a seat support including an upper shell including a seating surface and a lower shell arranged to cooperate with the upper shell to form an interior region under the seating surface and
a support foundation arranged to extend into the interior region of the seat support to lie under the seating surface and adapted to set on a vehicle seat, the support foundation being coupled to the seat support for pivotable movement about a pivot axis relative to the seat support in the interior region and through a bottom opening formed in the lower shell to orient the seating surface of the seat support to lie in a desired position regardless of the inclination of the vehicle seat underlying the support foundation.

15. The booster seat of claim 14, further comprising a seat unit mounted on the upper shell to overlie the seating surface of the upper shell and a retainer coupled to the seat unit and to the upper shell to retain the seat unit in a fixed position on the tiltable base.

16. The booster seat of claim 15, wherein the retainer is also coupled to the lower shell.

17. The booster seat of claim 16, wherein each of the seat unit, upper shell, and lower shell is formed to include retainer-receiving apertures and the retainer is a rod sized to slide through the retainer-receiving apertures formed in the seat unit, upper shell, and lower shell to retain the seat unit in a fixed position on the upper shell.

18. The booster seat of claim 15, wherein the seat unit includes a seat bottom and a foot coupled to the seat bottom and formed to include at least one retainer-receiving aperture through which a retainer rod passes.

19. The booster seat of claim 18, wherein the upper shell is formed to include a foot receiver and the foot in the seat unit extends into the foot receiver to establish a selected location of the seat unit relative to the upper shell of the tiltable base.

20. The booster seat of claim 19, wherein the upper shell includes a side wall arranged to depend from the seating surface of the upper shell to define a boundary of the foot receiver and formed to include a retainer-receiving aperture through which the retainer rod passes.

21. The booster seat of claim 18, wherein the seat unit is a high back juvenile seat including a seat back extending upwardly from the seat bottom and the foot extends downwardly from the seat bottom in a direction away from the seat back.

22. The booster seat of claim 18, wherein the seat unit is a backless juvenile saddle including a saddle plate and the foot is coupled to an underside of the saddle plate.

23. The booster seat of claim 14, wherein the upper shell is formed to include a foot receiver having an opening in the seating surface and further comprising a seat unit mounted on the upper shell and arranged to extend into the foot receiver to locate the seat unit in a selected location relative to the upper shell.

24. The booster seat of claim 23, further comprising a retainer arranged to extend through the foot receiver to anchor the seat unit on the upper shell in the selected location.

25. The booster seat of claim 23, wherein the seat unit includes a seat bottom arranged to overlie the seating surface of the upper shell and a foot extending downwardly from the seat bottom into the foot receiver.

26. The booster seat of claim 25, further comprising a retainer arranged to extend through retainer-receiving apertures formed in a portion of the upper shell defining the foot receiver and in the foot of the seat unit.

27. The booster seat of claim 26, wherein the retainer is arranged also to extend through retainer-receiving apertures formed in the lower shell.

28. The booster seat of claim 23, wherein the foot receiver is located to lie above the support foundation.

29. The booster seat of claim 28, further comprising a retainer coupled to the seat unit and to the upper shell and the support foundation is formed to include a notch sized to receive a portion of the retainer therein upon movement of the support foundation about the pivot axis to a retracted position within the interior region under the seating surface.

30. The booster seat of claim 29, wherein the retainer is also coupled to the lower shell.

31. The booster seat of claim 29, wherein the retainer is arranged to extend through the foot receiver and the notch is formed in a side wall of the support foundation positioned to lie in a space located between the foot receiver and a side wall of the lower shell.

32. The booster seat of claim 14, wherein the lower shell is formed to include a handle-receiving aperture and further comprising a releasable lock mechanism located in the interior region, the releasable lock mechanism comprises an anchor mounted on the support foundation and an actuator mounted on the seat support for movement in the interior region between a locking position engaging the anchor and a lock-releasing position disengaging the anchor, and the actuator is configured to include a pull handle arranged to extend outside the interior region through the handle-receiving aperture formed in the lower shell.

33. The booster seat of claim 14, wherein the seating surface of the upper shell is formed to include a pair of spaced-apart first and second lap belt-receiving apertures and the seat support is formed to include a foot receiver having an opening in the seating surface in a location between the first and second lap belt-receiving apertures and further comprising a seat unit arranged to overlie the seating surface and formed to include a foot extending into the foot receiver to locate the seat unit in a predetermined location over the seating surface.

34. The booster seat of claim 33, wherein the seat unit is a high back juvenile seat including a seat bottom carrying the foot on an underside thereof, a seat back extending upwardly from the seat bottom in a first direction, a first armrest coupled to the seat bottom and back to form a first lap belt-receiving opening aligned with the first lap belt-receiving aperture formed in the seating surface of the upper shell cooperatively to define a first lap belt passageway on a first side of the foot receiver, and a second armrest coupled to the seat bottom and back to form a second lap belt-receiving opening aligned with the second lap belt-receiving aperture formed in the seating surface of the upper shell cooperatively to define a second lap belt passageway on an opposite second side of the foot receiver.

35. A booster seat for supporting a child in a seated position in a vehicle, the booster seat comprising
a tiltable base adapted to set on a vehicle seat, the tiltable base including a seat support providing a seating surface and a pair of armrests coupled to the seat support and arranged to lie in spaced-apart location to one another to locate the seating surface therebetween,
a seat unit mounted on the tiltable base to overlie the seating surface, and a retainer coupled to the seat unit and to the tiltable base to retain the seat unit in a fixed position on the seating surface between the armrests provided in the tiltable base wherein the tiltable base is formed to include a foot receiver, the seating surface is formed to include an opening into the foot receiver, the seat unit includes a foot extending into the foot receiver, and the retainer is arranged to extend through the foot receiver.

36. A booster seat for supporting a child in a seated position in a vehicle, the booster seat comprising a tiltable base adapted to set on a vehicle seat, the tiltable base including a seat support providing a seating surface and a pair of armrests coupled to the seat support and arranged to lie in spaced-apart location to one another to locate the seating surface therebetween, a seat unit mounted on the tiltable base to overlie the seating surface, and a retainer coupled to the seat unit and to the tiltable base to retain the seat unit in a fixed position on the seating surface between the armrests provided in the tiltable base wherein the tiltable base further includes a first armrest pivot support coupled to a rear side portion of the seat support to lie adjacent to the seating surface and a first of the armrests is mounted on the first armrest pivot support for movement about a pivot axis between a closed armrest positions and an opened belt-receiving position to facilitate passage of a seat lap belt through a space located between the seating surface and the first armrest.

37. The booster seat of claim 36, wherein the tiltable base further includes a first armrest retainer coupled to a forward side portion of the seat support to lie adjacent to the seating surface and the first of the armrests includes a proximal end pivotably coupled to the first armrest pivot support and an opposite free end configured to mate with the first armrest retainer upon movement of the first of the armrests to the closed armrest position to retain the first of the armrests in the closed armrest position.

38. A booster seat for supporting a child in a seated position in a vehicle, the booster seat comprising a tiltable base adapted to set on a vehicle seat, the tiltable base including a seat support providing a seating surface and a pair of armrests coupled to the seat support and arranged to lie in spaced-apart location to one another to locate the seating surface therebetween, a seat unit mounted on the tiltable base to overlie the seating surface, and a retainer coupled to the seat unit and to the tiltable base to retain the seat unit in a fixed position on the seating surface between the armrests provided in the tiltable base wherein the seat unit and the tiltable base are formed to include retainer-receiving apertures located under the seating surface and the retainer is arranged to pass through the retainer-receiving apertures.

* * * * *